Sept. 24, 1940.  W. CHRISTIANSEN  2,216,032
CONTROL DEVICE
Filed March 2, 1939  2 Sheets-Sheet 1
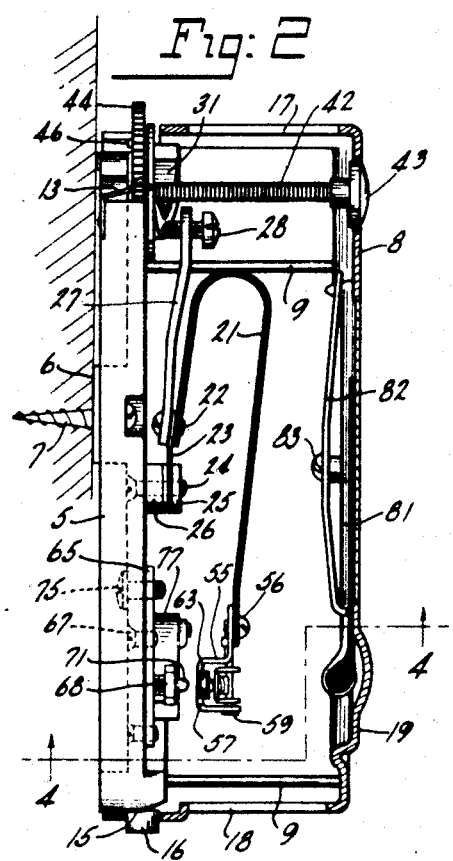
Fig: 2
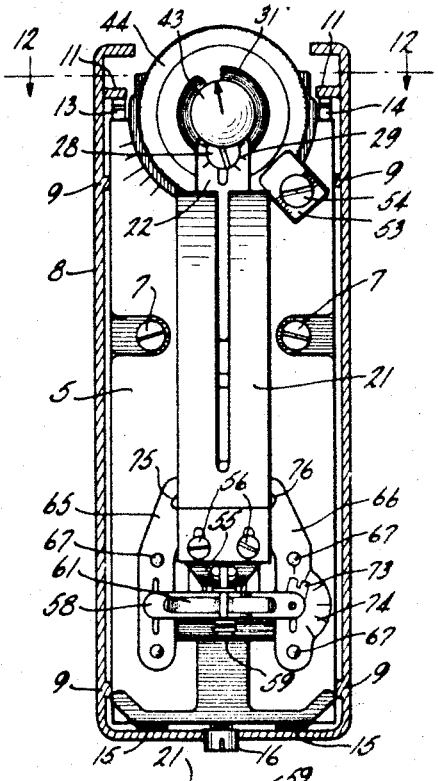
Fig: 3
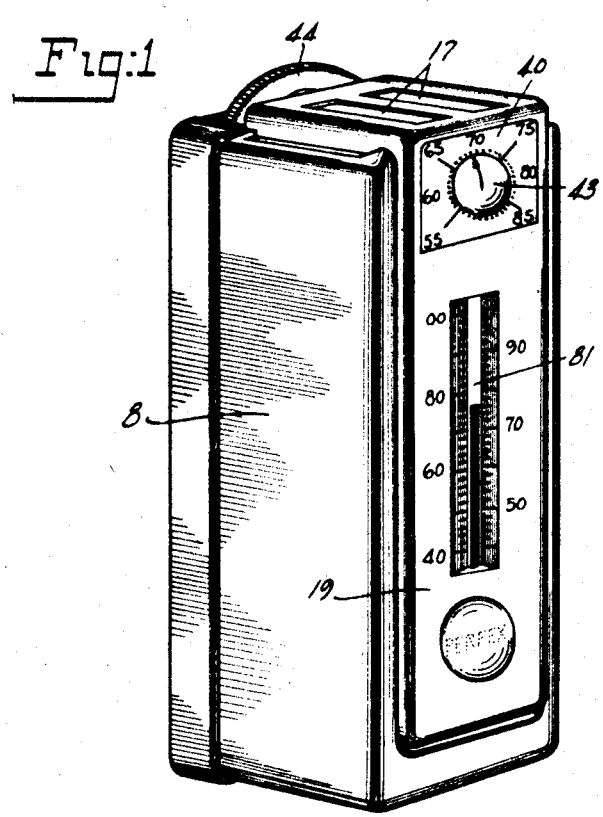
Fig: 1
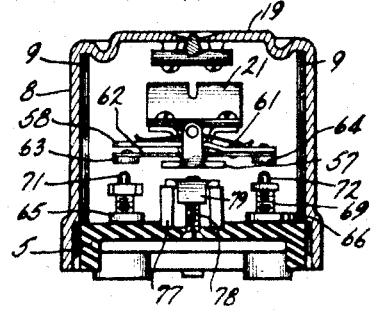
Fig: 5
Fig: 4
INVENTOR.
William Christiansen
BY
ATTORNEY.

Sept. 24, 1940.     W. CHRISTIANSEN     2,216,032
CONTROL DEVICE
Filed March 2, 1939     2 Sheets-Sheet 2
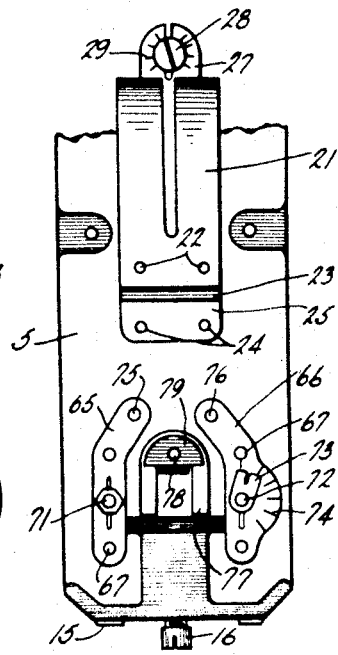
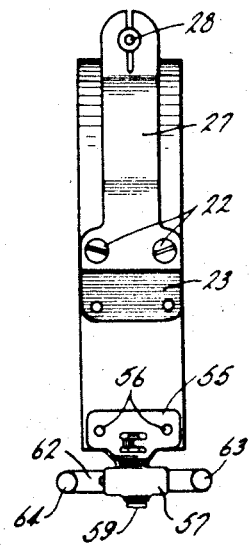
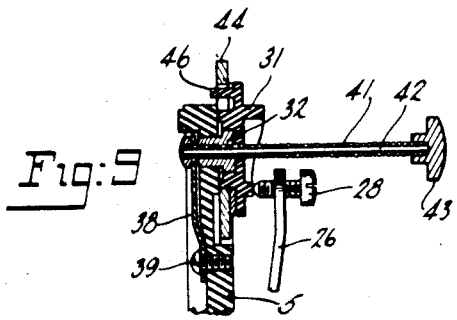
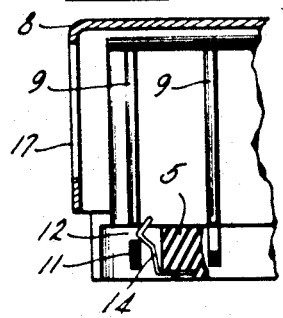
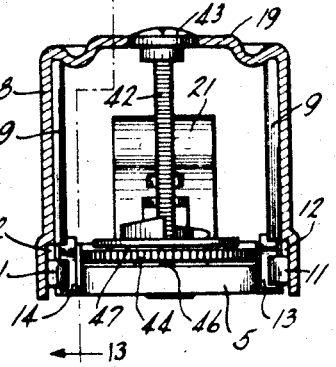
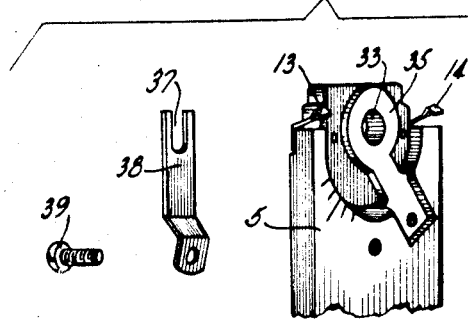
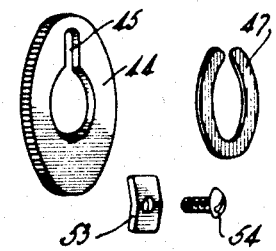
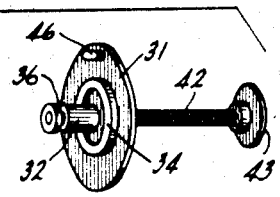
INVENTOR.
William Christiansen
BY
ATTORNEY.

Patented Sept. 24, 1940

2,216,032

UNITED STATES PATENT OFFICE 2,216,032

CONTROL DEVICE

William Christiansen, Milwaukee, Wis., assignor to Perfex Corporation, Milwaukee, Wis., a corporation of Wisconsin Application March 2, 1939, Serial No. 259,323

19 Claims. (Cl. 200—139)

This invention is concerned primarily with electrical control devices but more particularly with control devices actuated by physical condition responsive means and the principal object is to design an improved control device having a number of desirable features tending to improve the operation and adjustment thereof.

The invention is applicable to control devices such as thermostatic switches for controlling the temperature of a room, for example. In these room thermostats it is the customary practice to provide some means for adjusting the temperature value at which the thermostats are to exercise their control and also with some means for indicating the adjusted control position. This adjusting means usually consisted of a manually rotatable disc, knob or lever having temperature graduations stamped thereon cooperating with some kind of indicator means. This adjusting means is also usually arranged on any one of the sides of the instrument, close to the base portion thereof and adjacent the supporting wall surface. With the adjusting means arranged in this manner it is difficult at times to discern the graduations, markings and temperature figures thereon especially in locations where the visibility is poor. The hand of the operator also obscures the indications when an adjustment is being made. This results at times in the operator setting the thermostat adjustment to effect a temperature control, at a value which is not at all in accordance with his wishes because he cannot clearly perceive what setting he actually is making.

It is an object of the present invention to eliminate the foregoing disadvantages and provide a control device which can be accurately set at a precise value and in which the value of the setting is at all times clearly visible.

A further object is to design a control device in which the means for manually adjusting the same is arranged in close proximity to the base portion while the indicating scale therefor is arranged upon the front face of the device remote from the adjusting means and in clear and unobstructed view. With an arrangement such as this it is possible to considerably reduce the extent to which the disc or knob protrudes from the edge of the device since it has no indications marked thereon which must be visible. A particular feature of the invention resides in the provision of a flexible connection between the adjusting disc and the indicator whereby the indicator may be aligned with the scale on the cover and any binding therewith is obviated.

An additional object is concerned with the provision of improved arrangements for removably associating the cover of a thermostat with the base upon which the operating mechanism is supported.

A further object is directed to improving the switching mechanism for a thermostatic switch whereby positive and accurate operation of the elements thereof is insured.

Other objects and advantages reside in certain novel features of construction, arrangement, operation and combination of the various elements which will be hereinafter more fully described and particularly pointed out in the appended claims.

A preferred embodiment of the invention is illustrated in the accompanying drawings in which:

Fig. 1 is a full perspective view of a thermostat control device of the present design;

Fig. 2 is a side view with the cover in section;

Fig. 3 is a plan view with the cover in section;

Fig. 4 is a cross-sectional bottom end view taken along the line 4—4 of Fig. 1 showing the switching contacts in open position;

Fig. 5 is a similar view but with the contacts shown closed;

Fig. 6 is a view of the lower portion of the base showing the fixed portion of the switching mechanism;

Fig. 7 is an underside view showing the movable portion of the switching mechanism;

Fig. 8 is a view showing in extended relationship the elements comprising the adjusting means for the thermostat;

Figs. 9, 10 and 11 show cross-sectional views of the upper portion of the base with various modifications of the temperature adjustment indicator; and Figs. 12 and 13 show fragmentary portions of the upper portion of the base and cover and their means of association.

Referring now particularly to Figs. 2 and 3 of the drawings the mechanism of the control device shown here as a room thermostat is supported upon an oblong insulating base 5 having a pair of protruding portions 6 extending from the rear thereof through which a pair of mounting screws 7 extend for the purpose of supporting the base 5, upon a wall or other surface. A metal enclosing cover or housing 8 completely encloses the base and mechanism thereon for protecting the same. A series of reinforcing ribs 9 are formed on the inside surface of the cover 8, the ends of which are formed with shoulder portions against which the base abuts (see Figs. 12 and 13). The rib ends are also provided with inclined portions to facilitate placing the cover 8 on the base 5 and to hold it in spaced relation from the sides thereof to prevent binding. Opposite the end of the upper set of ribs 9 a projecting portion 11 is formed on each side of the cover providing a space portion or notch 12 between the parts 9 and 11. A pair of spring clips 13 and 14 are supported on opposite sides of the upper end of the base and are each arranged to be snapped in place in the notches 12 when the cover 8 is placed upon the base 5. To hold the spring clips in the notches the lower end of base 5 is formed with inclined surfaces 15 which bear against the bottom of the cover. A locking screw 16 threads into the bottom end of the base 5 and has a head portion engaging a slotted opening in the cover bottom for the purpose of removably securing the cover to the base. With the foregoing arrangement binding or straining of the mechanism on the base and cover is eliminated and the delicate adjustment thereof is maintained intact at all times. At the top and bottom ends of the cover 8 a number of slots 17 and 18 respectively, are provided for the purpose of permitting the circulation of the ambient air through the instrument to produce its effect upon the operating mechanism mounted upon the base. The front and top portions of the cover are also formed with a slightly protruding portion 19 for a purpose to be hereinafter pointed out.

The means in the control device which is responsive to a physical condition such as temperature variations is shown in the form of a U-shaped bimetallic element 21 which is slotted and is effective to actuate the switching mechanism by movement in a direction perpendicular to the base 5. One end of the bimetal element 21 is secured by screws 22 to one end of a steel spring hinge 23 which is tensioned to bias the bimetal element toward the base. The other end of spring hinge 23 is fastened by screws 24 and a clamping plate 25 to a protruding portion 26 formed on the base 5. Positioned between the base 5 and the anchored end of the bimetal element 21 and secured with it to the spring hinge 23, is a stiff calibrating arm 27 extending upwardly of the base and provided with a calibrating screw 28 at its end. A graduated scale 29 is marked upon the end of the arm 27 around the screw 28 to indicate the setting of the calibrating screw. (See Fig. 6.)

Positioned for axial rotation upon the upper end of the base 5 and perpendicular thereto is an insulated cam disc 31 provided with a cam surface on the front side thereof upon which the screw 28 rides when the cam is rotated. The cam disc 31 has a brass stud 32 molded on the rear side thereof. (See Fig. 8.) This cam disc 31 is provided for the purpose of adjusting the temperature operating point of the bimetal element 21. The stud 32 extends through an aperture 33 in the base 5 which serves as a bearing when the disc 31 is rotated. A raised shoulder portion 34 on the disc 31 is arranged in rotatable engagement with a similar shoulder 35 formed on the base 5 provides a small frictional bearing surface for the disc and also spaces the disc from the base slightly. The stud 32 is provided with a circular groove 36 near its end which projects slightly beyond the base 5 where it is engaged by the forked end 37 of a leaf spring 38, the other end of which is fastened to the rear side of the base by a screw 39. The leaf spring 38 is tensioned away from the base 5 so as to maintain the disc 31 in resilient frictional engagement with the base at all times so as to maintain the adjusted setting of the disc 31 in accordance with the scale markings 40 stamped upon the front portion 19 of the cover 8. The means for indicating the disc setting includes a coiled spring 41 wound around a thin elongated stem 42 to render it flexible and at the same time rugged and sturdy in construction. One end of the stem 42 is rigidly fastened to an indicator disc 43 which extends within an opening formed in the cover 8 and is arranged to cooperate with the scale 40 to indicate temperature settings. The other end of stem 42 extends into the stud 32 where it is suitably soldered in place. In order to provide a means for rotating the disc 31 a flat disc 44 is provided which has an opening therein so that it fits snug over the outside of the shoulder 34 of the disc 31 and against the shoulder 35. A slot 45 cut in the disc 44 is engaged by a stop 46 on the rear of the cam disc 31 so that whenever the disc 44 is manually manipulated by applying rotary pressure to its knurled edge the disc 31 as well as the indicator 43 are rotated. The stop 46 is adapted to engage an extended portion of the shoulder 35 on the base so as to limit the rotation of disc 44 in either direction of movement. Interposed between both of the discs 31 and 44 is a thin spring washer 47 which normally urges and holds the disc 44 against the shoulder 35 to keep the disc from being too loose or rattling on the stud 32.

It will be clear from the foregoing construction and arrangement that the disc 44 is positioned close to a wall or surface on which the base 5 is mounted, and protrudes only far enough from the casing (see Fig. 1) to enable it to be manipulated easily and still not be too conspicuous. The indicator 43 which is moved by the disc 44, on the other hand, is arranged at a point remote from the disc 44 and in axial alignment therewith on the front of the cover where it is clearly visible and in unobstructed view so that an accurate setting of the indicator with respect to the scale 40 can readily be made. The flexibility of the stem 42 enables the indicator 43 to be easily centered in the cover opening through which it extends when the cover is placed upon the base 5. This flexibility also prevents binding and too great a frictional engagement with the cover opening when the indicator is being adjusted. The calibrating screw 28 provides a simple means for calibrating the action of the bimetal element 21 at any desired temperature value. Turning the screw 28 to any of the graduations on arm 27 moves the arm 27 to thereby vary the position of the bimetal element with respect to the base so that it will effect its switching control in accordance with the reading of a standard condition indicating device such as a thermometer, for example. A temperature rise causes the free end of the bimetal element to move in a direction away from and perpendicular to the base of the device.

Fig. 9 illustrates the flexible stem 42 constructed in the preferred form. Fig. 10 is a modified form in which the stem constitutes a thin rod 48 threaded into the stud 31 and may be used where the advantages presented by flexible stem 42 are not required. Fig. 11 is a further modified form of stem in which two short sections of a rod 49 and 51 are joined or coupled together by a coiled spring 52 at their ends, resulting in an arrangement and resultant function similar to that presented in Fig. 9.

Under certain circumstances it may be desirable to prevent unauthorized manipulation and adjustment of the thermostat and for this purpose a locking clamp 53 is loosely arranged in a recess in the base 5. A locking screw 54 threads into the base and when screwed in, clamps the clamping member 53 directly on top of the disc 44 to hold it against the raised portion 35 of the base and prevents its rotation. Since there is no rigid connection between the discs 31 and 44 the adjustment and calibration of the disc 31 with respect to the bimetal element 21 remains unaltered when the disc 44 is locked in position.

The means for actually controlling the physical condition to which the control device responds is here disclosed in the form of an electrical switching mechanism which may control the circuit of some air conditioning device such as a heating plant, for example. The movable portion of the switching mechanism is supported from the free movable end of the bimetal element 21 and includes a bracket member 55 held in place on the end of the bimetal element 21 by a pair of screws 56 passing through slotted openings in the element 21 so that the bracket 55 may be shifted to adjust or align the switching mechanism. The bottom of a U-shaped portion of the bracket 55 constitutes a magnetic armature 57. A flat rigid stop bar 58 is arranged above the armature 57 and between the U-shaped ends of the bracket 55 where it is pivotally supported by a pivot pin 59, extending into the bracket ends. In order to eliminate lost motion between the rigid bar, its supporting pivot pin 59 and the bracket 55 a curved leaf spring 61 is disposed under the pin and bears against the bar 58. This eliminates any lost motion or loose connections which may affect the reliable operation of the switching mechanism as will be hereinafter apparent. A flexible arm 62 is arranged between the armature 57 and the rigid bar 58. It is riveted, as shown to an offset portion of the rigid bar 58 leaving the other end spaced from the other end of the bar 58. One movable contact 63 is secured to the free end of the flexible arm 62 and another contact 64 is riveted to both the flexible arm 62 and rigid bar 58.

The stationary portion of the switching mechanism includes two oppositely disposed contact plates 65 and 66 fastened to the base 5 as by a plurality of screws 67 as shown. Contact studs 68 and 69 adjustably thread into the plates 65 and 66 and support fixed contacts 71 and 72, respectively, at their ends. The stud 69 is also provided with an adjusting arm 73 having a screw driver slot therein cooperable with an indicating scale 74 stamped on contact plate 66 for the purpose of adjusting the differential operation of the thermostat switch. A pair of terminal screws 75 and 76 are threaded into the plates 65 and 66, respectively, from the rear of the base 5 and serve for the connection of the wires (not shown) to the control device. A horse shoe shaped permanent magnet 77 is clamped to the base 5 by a screw 78 and a clamping plate 79 in a position between the two sets of contacts and so as to magnetically influence the armature 57 when the armature is moved in closer proximity thereto to provide snap action to the opening and closing of the contacts.

A suitable thermometer 81 is positioned behind an opening in the cover 8 and cooperates with the scale shown on the cover to indicate the room temperature. The thermometer 81 is held against the rear of the cover by a resilient metal strip 82 engaging the thermometer ends which in turn is fastened at its center to the cover by a pair of screws 83 which engage slotted openings in the metal strip 82 so that the strip can shift the thermometer 81 with regard to the scale on the cover and thereby calibrate the same for accurate reading.

For a more detailed explanation of the construction and operation of certain parts of the control device reference may be had to the copending application of Herbert E. Lindemann, Serial Number 186,370, filed January 22, 1938.

What is claimed is:

1. A control device of the class described, comprising a base, physical condition responsive switching means on the base, means on the base for adjusting the physical condition responsive switching means, a cover having an opening in the front thereof, an indicator positioned in the cover opening, and a flexible member connecting the adjusting means with the indicator, said adjusting means said cover opening, said indicator, and said flexible member, all arranged in axial alignment perpendicular to the base.

2. A control device of the class described, a base, a physical condition responsive means on the base, switching mechanism operated by said condition responsive means, a cover for enclosing the condition responsive means and the switching mechanism, an adjustable disc arranged with its axis perpendicular to the base for adjusting the value at which the condition responsive means operates the switching mechanism, said adjustable disc protruding through the top of the cover so as to be accessible for manual manipulation, an indicator positioned in an opening in the front of the cover, a connecting rod coupling the adjustable disc with the indicator whereby the indicator is rotated with the disc, and scale markings around the cover opening cooperating with the indicator for indicating the adjusted position of the disc, said disc, said indicator, and said connecting rod, all arranged in axial alignment.

3. In a control device of the class described the combination of an elongated base having switching mechanism and means for operating it mounted upon the base, together with a cover over the base enclosing the switching mechanism and the operating means, and adjusting member for the operating means rotatably arranged upon the base with its axis of rotation extending perpendicular thereto, said adjusting member having an exposed portion protruding from the cover so as to be accessible for rotary manual manipulation, an indicator projecting through an opening in the front of the cover, a connecting stem extending perpendicular from the adjusting member and supporting the indicator in the cover opening, and scale markings stamped upon the cover around the indicator opening and cooperating with the indicator for indicating the setting of the adjusting member dial, said adjusting member, said indicator and said connecting stem, all arranged in axial alignment.

4. In a control device, a base, a physical condition responsive switching element on the base, means on the base for adjusting the operation of the switching element, said adjusting means comprising a disc rotatably mounted upon the base with its axis arranged perpendicular to the base, a cover for enclosing said switching element arranged on the front of the base, said cover having an opening in one side thereof and another on the front thereof, said adjusting disc protruding through the side cover opening, an indicator located in the front cover opening, a flexible connection extending between the axis of the adjusting disc and the indicator whereby the rotation of the adjusting disc effects a rotation of the indicator, and an indicating scale arranged on the cover around the opening for the indicator.

5. A control device of the class described comprising a base, a physical condition responsive means on the base, switching mechanism operated by the physical condition responsive means, a cover for enclosing the physical condition responsive means and the switching mechanism and having an opening in the front thereof, an adjusting means on the base for the physical condition responsive means, said adjusting means protruding through the cover and accessible for manipulation outside thereof, an indicator positioned in the opening in the front of the cover, connecting means for coupling the indicator with the adjusting means, said adjusting means, said indicator and said connecting means all arranged in axial alignment and perpendicular of the base whereby manipulation of the adjusting means effects a movement of the indicator, and cooperating indicating means on the indicator and on the cover for indicating the position of the adjusting means.

6. A control device of the class described comprising a base, physical condition responsive means supported on the base, switching mechanism actuated by said condition responsive means, an enclosing cover for the condition responsive means and the switching mechanism mounted upon the base, adjusting means for the condition responsive means comprising an adjustable member rotatably arranged on the base and protruding through the cover for manual manipulation outside thereof, an indicating disc, said cover having an opening in the front thereof through which said indicating disc protrudes, connecting means for coupling said indicating disc with said adjustable member whereby rotation of the adjustable member also rotates the indicating disc, said adjustable member, said indicating disc and said connecting means therebetween, all arranged with their axis of rotation perpendicular to the base, and an indicating scale cooperating with the indicating disc arranged around the cover opening.

7. In a thermostatic control device including a mounting base arranged for mounting the device upon a wall surface, a thermostatic element supported upon the base, switching mechanism on the base operated by the thermostatic element, an enclosing cover on the base for the thermostatic element and switching mechanism, a rotatable member for adjusting the temperature point at which the thermostatic element operates the switching mechanism, said rotatable member arranged on the base with its axis of rotation perpendicular thereto and having a small portion thereof protruding through the cover adjacent the supporting wall surface whereby the rotatable member is accessible for manipulation, a connecting stem extending axially from the rotatable member, an indicating disc supported on the end of the connecting stem remote from the rotatable member and arranged in axial alignment therewith whereby rotation of the rotatable member also rotates the indicating disc, said cover having an opening therein within which said indicating disc is arranged, and a series of scale markings on the cover around the opening therein cooperating with the indicating disc for indicating the setting of the rotatable member.

8. In a control device, a base, a physical condition responsive switching element on the base, means on the base for adjusting the operation of the switching element, said adjusting means comprising a disc rotatably mounted upon the base with its axis arranged perpendicular to the base, a cover associated with the base for enclosing said switching element, said cover having an opening in the top side thereof and another on the front thereof, said adjusting disc protruding through the top cover opening, an indicating disc arranged in the front cover opening, a flexible connection extending between the axis of the adjusting disc and the indicating disc whereby the rotation of the adjusting disc effects a rotation of the indicating disc, and an indicating scale arranged on the cover around the cover opening for the indicating disc, said flexible connection enabling the cover to be removably associated with the base and to relieve friction between the cover opening and the indicating disc when it is rotated.

9. A control device of the class described, comprising a base, physical condition responsive switching means on the base, a helical cam on the base for adjusting the physical condition responsive switching means, a disc loosely coupled to the cam for turning the same and having an opening therein, a spring washer for resiliently forcing the cam and the disc apart, a spring clip fastened to the base, a shaft on the cam extending through the base and engaged by the spring clip for holding the cam and disc assembly to the base, a cover for said mechanism, said cover having an opening in its top through which the disc protrudes and a second opening in the front of the cover, an indicator positioned in the second cover opening, and means for connecting the indicator to the helical cam.

10. A control device of the class described, comprising a base, physical condition responsive switching means on the base, adjusting means on the base for the physical condition responsive switching means, a rod projecting from the adjusting means, a cover having an opening in the front thereof, an indicator positioned in the cover opening, a second rod fastened at one end to the indicator, and a spring fastened to the free ends of the first and second rods for coupling the adjusting means with the indicator, said rods, said indicator and said spring, all arranged in axial alignment.

11. A control device of the class described, comprising a base, a temperature responsive element mounted on the base, a combination U-shaped bracket and magnetic armature fastened to the element, a rigid bar carrying a pair of movable contacts, a pin for pivoting said rigid bar to said U-shaped bracket, a leaf spring arranged between the pivot pin and the rigid bar for preventing lost motion therebetween, a flexible member fastened to said rigid bar carrying at least one of the movable contacts, a pair of fixed contacts on the base arranged to be engaged by the movable contacts responsive to the actuation of the temperature responsive element, and a permanent magnet cooperating with the armature for imparting snap action to the actuation of the contacts.

12. A control device of the class described comprising a supporting base adapted for mounting upon a wall surface and having switching mechanism mounted thereon, a cover on the base enclosing said switching mechanism, a manual adjusting means for the switching mechanism rotatably mounted upon the front surface of the base and having a portion projecting beyond an edge thereof whereby the adjusting means is positioned close to the supporting wall surface, an indicator projecting perpendicularly from the base and in axial alignment with the adjusting means, said indicator extending to the front surface of the cover remote from the adjusting means and rotatable therewith, said cover having an opening in the front surface through which said indicator is visible, and cooperating indicating means on the indicator and adjacent the cover opening for indicating the position of the adjusting means.

13. A control device of the class described comprising a base and switching mechanism arranged upon the base, a cover for the switching mechanism having an opening in the front thereof, a rotatable switch adjusting disc on the base extending beyond an edge of the base and outside the cover so as to be accessible for manual manipulation, a helical cam variably engaging the switching mechanism and controlled by the adjustable disc, an indicator disc associated with said adjusting disc and arranged adjacent the front cover opening, said indicator disc being visible through said front cover opening and arranged in axial alignment with said adjusting disc, and cooperating indicating means on the face of the indicating disc and adjacent the front cover opening for indicating the adjusting setting of the adjusting disc.

14. In a room thermostat, an elongated supporting base adapted for mounting upon a wall surface, thermostatic switching mechanism mounted upon the front surface of the base, a cover on the base enclosing said switching mechanism, a rotatable disc supported on the base for adjusting the temperature value at which the switching mechanism is operated, said disc arranged parallel with and against the front surface of the base and having a portion thereof projecting beyond an edge of the base outside the cover whereby the disc is accessible for manual manipulation, a helical cam on the adjusting disc variably engaging the switching mechanism when the disc is adjusted, a stem extending from the helical cam to a position adjacent the front surface of the cover, said cover having an opening in its front surface adjacent the end of the stem, and cooperating indicating means on the end of the stem and adjacent the cover opening for indicating the adjusted position of the adjusting disc; said adjusting disc, said helical cam, said stem, and said cover opening all arranged in axial alignment perpendicular to the base.

15. A control device of the class described comprising a base, switch operating means arranged upon the base, a cover on the base for the switch operating means having a plurality of openings therein, switch adjusting means including a helical cam rotatably mounted upon the base and having a portion accessible for manual manipulation through one of the cover openings, indicating means having a portion visible through another of the cover openings, means coupling the indicating means with the adjusting means whereby the rotation of the adjusting means also rotates the indicating means, said adjusting means and said indicating means arranged in axial alignment with their axes perpendicular of the base, cooperating indicia on the indicating means and adjacent the second mentioned cover opening for indicating the adjusted setting of the switch operating means, and means on the base for limiting the rotation of the adjusting means.

16. In a control device, a base, a thermostatic element supported upon the base, switching means controlled by the element responsive to temperature changes, a cover for enclosing the switching means and thermostatic element having an opening in the front thereof, and means for adjusting the temperature value at which the element controls the switching means, said adjusting means comprising a flat disc arranged adjacent and parallel to the front surface of the base, said disc also having a portion extending beyond an edge of the base and outside the cover so as to be accessible for manual manipulation, a helical cam projecting from the disc and arranged to adjust the thermostatic element upon rotation of the disc, an adjustment indicator located in the cover opening, cooperating indicia adjacent the cover opening and on the indicator for indicating the adjusted position of the disc, said indicator positioned at a point remote from the disc but rotatable therewith; said disc, said cam and said indicator all arranged in axial alignment perpendicular of the base, and means on the base for limiting the rotation of the adjusting disc.

17. A control device of the class described comprising, a base, switch operating means on the base, rotatable adjusting means on the base for adjusting the value at which the switch operating means is actuated, a cover for the switch operating means arranged on the base and having an opening therein, an indicator located in the cover opening and arranged in axial alignment with the adjusting means, and a flexible connection extending between the adjusting means and the indicator, said flexible connection comprising a thin elongated stem and a coil spring wound thereupon.

18. A control device of the class described comprising, a base, a switch operating means on the base, a cover on the base for the switch operating means having an opening therein, a rotatable adjusting member for adjusting the value at which the switch operating means is actuated, said adjusting member projecting beyond an edge of the base and outside the cover, an indicator located in the cover opening and arranged in axial alignment but remote from the adjusting member, and a flexible connection extending between the adjusting member and the indicator, said flexible connection including a thin elongated stem secured at one end to the axis of the adjusting member and supporting the indicator on its other end, and a coil spring tightly encircling the stem whereby the indicator is positively rotated with the adjusting member.

19. A control device of the class described comprising, a base, a switch operating means mounted on the base, a cover on the base for the switch operating means having an opening therein, a rotatable adjusting member for adjusting the value at which the switch operating means is actuated, an indicator disc for indicating the adjustment of the adjusting member, a flexible stem connected to the adjusting member and supporting the indicator disc in the cover opening, said adjusting member, said indicator disc and said stem all arranged in axial alignment perpendicular to the base, and a coil spring closely wound around the flexible stem whereby the indicator disc is positively rotated with the adjusting member but the stem is enabled to be flexed from its perpendicular position with respect to the base.

WILLIAM CHRISTIANSEN.

CERTIFICATE OF CORRECTION.

Patent No. 2,216,032. September 24, 1940.

WILLIAM CHRISTIANSEN.

It is hereby certified that error appears in the printed specification of the above numbered patent requiring correction as follows: Page 3, second column, line 40, claim 3, for the word "and" before "adjusting" read --an--; line 53, same claim, strike out "dial"; page 5, first column, line 24, claim 13, for "adjusting" read --adjusted--; and that the said Letters Patent should be read with this correction therein that the same may conform to the record of the case in the Patent Office.

Signed and sealed this 5th day of November, A. D. 1940.

(Seal)

Henry Van Arsdale,
Acting Commissioner of Patents.